(12) United States Patent
Liang et al.

(10) Patent No.: US 12,538,367 B2
(45) Date of Patent: Jan. 27, 2026

(54) RELAY UE DETERMINING METHOD AND DEVICE

(71) Applicant: VIVO MOBILE COMMUNICATION CO., LTD., Dongguan (CN)

(72) Inventors: Jing Liang, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 566 days.

(21) Appl. No.: 17/949,204

(22) Filed: Sep. 20, 2022

(65) Prior Publication Data

US 2023/0026021 A1  Jan. 26, 2023

Related U.S. Application Data

(63) Continuation of application No. PCT/CN2021/082470, filed on Mar. 23, 2021.

(30) Foreign Application Priority Data

Mar. 23, 2020  (CN) .......................... 202010209287.4

(51) Int. Cl.
*H04W 40/22* (2009.01)
*H04W 36/00* (2009.01)
*H04W 76/14* (2018.01)
*H04W 28/02* (2009.01)

(52) U.S. Cl.
CPC ......... *H04W 76/14* (2018.02); *H04W 36/037* (2023.05); *H04W 28/0215* (2013.01)

(58) Field of Classification Search
CPC ..... H04W 76/14; H04W 88/04; H04W 8/005; H04W 92/18; H04W 40/246; H04W 88/02; H04B 7/15507; H04B 7/14; H04B 7/15; H04B 17/327
See application file for complete search history.

(56) References Cited

U.S. PATENT DOCUMENTS

| | | | |
|---|---|---|---|
| 10,602,568 B2 * | 3/2020 | Jung | ..................... H04W 76/30 |
| 2008/0188177 A1 * | 8/2008 | Tan | ....................... H04W 16/26 |
| | | | 455/11.1 |

(Continued)

FOREIGN PATENT DOCUMENTS

| | | |
|---|---|---|
| CN | 104936247 A | 9/2015 |
| CN | 105188099 A | 12/2015 |

(Continued)

OTHER PUBLICATIONS

International Search Report issued in corresponding International Application No. PCT/CN2021/082470, mailed Jun. 21, 2021, 4 pages.

(Continued)

*Primary Examiner* — Sai Aung
(74) *Attorney, Agent, or Firm* — IPX PLLC

(57) ABSTRACT

A relay User Equipment (UE) determining method and a device are provided. The relay UE determining method includes: obtaining relay-related information corresponding to each candidate UE in at least one candidate UE; and performing relay UE selection or relay UE reselection according to the relay-related information corresponding to each candidate UE.

19 Claims, 7 Drawing Sheets

(56) References Cited

U.S. PATENT DOCUMENTS

| | | | | |
|---|---|---|---|---|
| 2014/0308966 A1* | 10/2014 | Wang | .................... | H04W 48/20 |
| | | | | 455/450 |
| 2014/0369332 A1* | 12/2014 | Seo | ....................... | H04W 84/12 |
| | | | | 370/338 |
| 2016/0095022 A1* | 3/2016 | Jin | .................... | H04W 36/0055 |
| | | | | 455/438 |
| 2017/0359116 A1 | 12/2017 | Hwang et al. | | |
| 2018/0084478 A1* | 3/2018 | Lee | ...................... | H04W 28/12 |
| 2018/0123682 A1* | 5/2018 | Jung | .................. | H04W 40/22 |
| 2018/0139681 A1* | 5/2018 | Jung | ................. | H04W 56/0015 |
| 2018/0139682 A1* | 5/2018 | Xu | ......................... | H04W 40/22 |
| 2018/0152986 A1* | 5/2018 | Jung | .................... | H04W 76/27 |
| 2018/0159616 A1* | 6/2018 | Aminaka | .............. | H04W 92/18 |
| 2025/0015874 A1* | 1/2025 | Ganguly | ........... | H04W 28/0236 |

FOREIGN PATENT DOCUMENTS

| | | |
|---|---|---|
| CN | 105430633 A | 3/2016 |
| CN | 106211026 A | 12/2016 |
| CN | 106572514 A | 4/2017 |
| CN | 106888494 A | 6/2017 |
| CN | 107925844 A | 4/2018 |
| CN | 108632919 A | 10/2018 |
| CN | 110461020 A | 11/2019 |
| EP | 3273745 A1 | 1/2018 |

OTHER PUBLICATIONS

First Office Action issued in related Chinese Application No. 202010209287.4 mailed Sep. 5, 2022, 11 pages.

Second Office Action issued in related Chinese Application No. 202010209287.4 mailed Feb. 24, 2023, 12 pages.

Third Office Action issued in related Chinese Application No. 202010209287.4 mailed Apr. 28, 2023, 6 pages.

* cited by examiner

```
A first UE obtains relay-related information corresponding to    201
each candidate UE in at least one candidate UE The first UE performs relay UE selection or relay UE reselection
according to the relay-related information corresponding to each  202
candidate UE
```

RELAY UE DETERMINING METHOD AND DEVICE

CROSS-REFERENCE TO RELATED APPLICATIONS

This application is a continuation of International Application No. PCT/CN2021/082470, filed on Mar. 23, 2021, which claims priority to Chinese Patent Application No. 202010209287.4, filed on Mar. 23, 2020. The entire contents of each of the above-identified applications are expressly incorporated herein by reference.

TECHNICAL FIELD

The present disclosure relates to the field of communications technologies, and in particular, to a relay User Equipment (UE) determining method and a device.

BACKGROUND

In a Long Term Evolution (LTE) system, data is transmitted between UEs by using a sidelink, that is, data is directly transmitted between UEs without using a network device.

Currently, to extend a cell coverage area (for example, a blind spot in cell coverage), a radio signal may be forwarded once or more by using a relay technology (for example, one or more relay nodes (for example, relay UEs) are added between a network device and a UE to replace a link of poor quality with a plurality of links of better quality (for example, a link between the network device and a relay UE, and a sidelink between the relay UE and the UE), thereby achieving a higher link capacity and a larger coverage area. Typically, when a plurality of relay UEs exist, the UE may select or reselect the relay UE. For example, the UE may perform relay UE selection according to a link between the UE and a base station and signal quality on the sidelink, or may perform relay UE reselection according to signal reception strength on the sidelink.

However, in a New Radio (NR) system, there is currently no specific solution for relay selection and reselection based on a sidelink, that is, there is no standard relay selection and reselection manner. Consequently, the UE cannot accurately perform relay UE selection and reselection.

SUMMARY

Embodiments of the present disclosure provide a relay UE determining method and a device.

According to a first aspect of the embodiments of the present disclosure, a relay UE determining method is provided and performed by a first UE. The relay UE determining method includes: obtaining relay-related information corresponding to each candidate UE in at least one candidate UE; and performing relay UE selection or relay UE reselection according to the relay-related information corresponding to each candidate UE.

According to a second aspect of the embodiments of the present disclosure, a UE is provided, and the UE is a first UE. The UE includes an obtaining module and a processing module. The obtaining module is configured to obtain relay-related information corresponding to each candidate UE in at least one candidate UE; and the processing module is configured to perform relay UE selection or relay UE reselection according to the relay-related information corresponding to each candidate UE obtained by the obtaining module.

According to a third aspect of the embodiments of the present disclosure, a UE is provided. The UE includes a processor, a memory, and a computer program that is stored in the memory and that be run on the processor, and when the computer program is executed by the processor, the steps of the relay UE determining method in the first aspect are implemented.

According to a fourth aspect of the embodiments of the present disclosure, a computer-readable storage medium is provided. The computer-readable storage medium stores a computer program, and when the computer program is executed by a processor, the steps of the relay UE determining method in the first aspect are implemented.

DETAILED DESCRIPTION

Figures 1, 2:
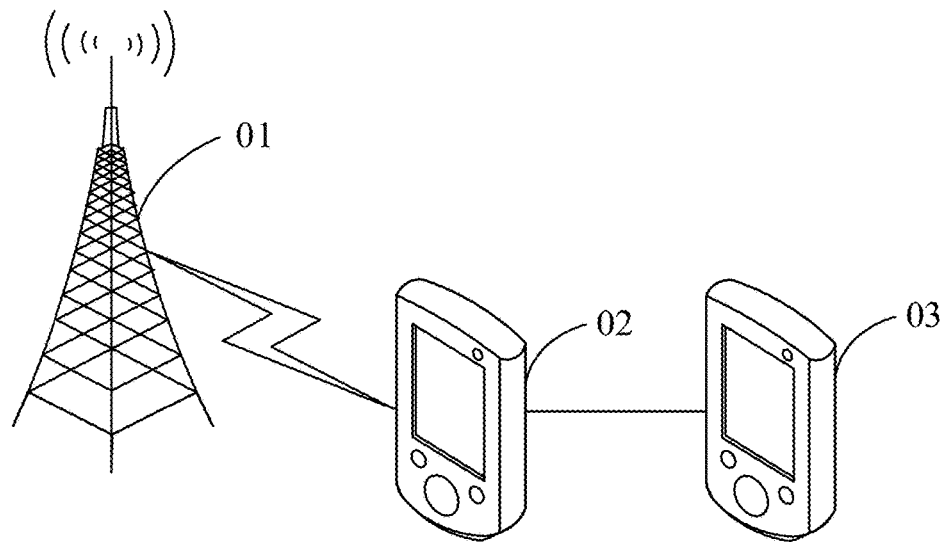
FIG. 1 is a schematic architectural diagram of a communications system according to an embodiment of the present disclosure.
FIG. 2 is a first schematic diagram of a relay UE determining method according to an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the specification and claims in the embodiments of the present disclosure, the terms "first", "second", and the like are intended to distinguish between different objects but do not describe a particular order of the objects. For example, a first cell identifier, a second cell identifier, and the like are intended to distinguish between different cell identifiers, instead of describing a particular order of the cell identifiers.

In the descriptions in the embodiments of the present disclosure, unless otherwise provided, "a plurality of" means two or more than two. For example, a plurality of elements means two or more elements.

In this specification, a term "and/or" is only an associative relationship for describing associated objects, indicating that three relationships may exist, for example, a display panel and/or backlight, which may indicate three situations: the display panel exists independently; the display panel and the backlight exist simultaneously; and the backlight exists independently. In this specification, a symbol "/" indicates an "or" relationship between associated objects, for example, input/out indicates input or output.

In the embodiments of the present disclosure, the word such as "example" or "for example" is used to represent giving an example, an illustration, or a description. Any embodiment or design scheme described as an "example" in the embodiments of the present disclosure should not be explained as being more preferred or having more advantages than another embodiment or design scheme. Exactly, use of the term "example" or "for example" is intended to present a concept in a specific manner.

The following describes some concepts and/or terms in a relay UE determining method and a device provided in the embodiments of the present disclosure.

1. Sidelink/Side Link/Edge Link/Bylink

A sidelink is supported in a communications system (for example, an LTE system or an NR system). The sidelink is a link for data transmission between UEs, that is, data may be transmitted between the UEs without a network device. A communications interface between UEs may be referred to as a PC5 interface, and a communications interface between a UE and an access network device may be referred to as a Uu interface.

A process in which the UE transmits information to another UE on the sidelink is referred to as sidelink communication. The sidelink communication may include Device-to-Device (D2D) communication, Vehicle-to-everything (V2X) communication, and the like. The V2X communication mainly includes Vehicle-to-Vehicle (V2V) communication, Vehicle-to-Infrastructure (V2I) communication, Vehicle-to-Network (V2N) communication, and Vehicle-to-Pedestrian (V2P) communication.

For example, LTE sidelink communication (that is, sidelink communication in an LTE system) may be used for a specific public safety service (for example, emergency communication at a fire site or an earthquake), or V2X communication. Internet of vehicles communication includes various services, such as basic security type communication, advanced (automatic) driving, formation, and sensor extension. An LTE sidelink only supports broadcast communication, and therefore is mainly used for basic security communication. Other advanced V2X services with a strict QoS requirement in terms of latency and reliability are supported by NR sidelink communication (that is, sidelink communication in an NR system). In the NR system, the LTE sidelink may be applied to an operating frequency of 6 GHz or above 6 GHz that is not supported by LTE, and supports a wider operating bandwidth.

2. Sidelink Transmission Manner

Current sidelink transmission may be classified into transmission manners such as broadcast, multicast, and unicast. Unicast is one-to-one transmission; multicast is one-to-many transmission; and broadcast is also one-to-many transmission, but broadcast does not mean that UEs belong to a same group. Currently, sidelink unicast and multicast communication supports a Hybrid Automatic Repeat reQuest (HARM) feedback mechanism at a physical layer.

3. Resource Allocation Modes: Mode 1 and Mode 2

Resource allocation modes of a sidelink UE may be classified into two types:

(1) Base station scheduling mode (Mode 1): A network device (base station) controls and allocates a resource to each UE (BS schedules SL resource (s) to be used by UE for SL transmission (s)).

(2) UE autonomous mode (Mode 2): Each UE independently selects a resource (UE determines, i.e., BS does not schedule, SL transmission resource (s) within SL resources configured by BS/network or pre-configured SL resources).

4. Relay Mechanism

In a relay technology in a radio communications system, one or more relay nodes are added between a base station and a UE to forward a radio signal one or more times, that is, the radio signal can reach the UE through a plurality of hops.

The radio relay technology can be used not only to extend cell coverage and make up for a blind spot in the cell coverage, but also to improve a cell capacity through spatial resource multiplexing. For indoor coverage, the relay technology can also overcome a penetration loss and improve indoor coverage quality.

For example, one relay device is included. In radio relay, a link from a base station to a UE is divided into a link from the base station to the relay device (relay station) and a link from the relay station to the UE, so that one link of poor quality can be replaced with two links of better quality, to obtain a higher link capacity and better coverage.

Currently, a relay supported in LTE is a UE-to-network relay, that is, one end of the relay is connected to a UE and one end is connected to a network side. The UE connected to the relay may be referred to as a remote UE.

For example, a remote UE needs to transmit data to a network device. However, due to poor coverage, a relay UE is used as for relay. There is a Uu interface between the relay UE and a base station, and a sidelink interface between the relay UE and the remote UE. Generally, the relay UE is open and can serve any remote UE. A function of a UE-to-UE relay is similar, except that two ends of the relay UE are connected to different UEs.

5. Relay Selection and Reselection

In an LTE system, when a remote UE meets a specified condition, relay UE selection or reselection is performed. Currently, selection is mainly determined based on a link between a UE and a base station and signal quality on a sidelink. Currently, reselection is mainly triggered by an upper layer of the remote UE when the remote UE finds that a measurement result of an Sidelink Discovery Reference Signal Received Power (SD-RSRP) is less than a threshold.

6. Quality of Service (QoS) Requirement of a V2X Service

LTE V2X Service

When an application layer needs to send a V2X message (or a V2X data packet) to an Access Stratum (AS) layer, ProSe Per-Packet Priority (PPPP) and ProSe Per-Packet Reliability (PPPR) information that are used to transmit the V2X message on a PC5 interface are carried. The PPPP indicates a priority during data packet transmission, and a higher priority of the PPPP (there are a total of eight values of the PPPP, and a smaller value represents a higher priority) indicates a higher data packet latency requirement. The PPPR indicates a requirement degree of reliability during data packet transmission.

For different V2X services, there are different performance requirements. Currently, indexes of performance requirements of an NR advanced V2X service are mainly as follows, and these indexes in NR may be identified by using a Prose QoS Indication (PQI).

7. 5QI/PQI

The 5QI may be understood as an index, and one 5QI corresponds to a set of QoS index parameters. The PQI may be understood as a special 5QI used for PC5, and also has its own value and a corresponding set of QoS parameters.

The embodiments of the present disclosure provide a relay UE determining method and a UE. A first UE may perform relay UE selection or relay UE reselection according to obtained relay-related information corresponding to each candidate UE in at least one candidate UE. In this solution, the first UE can learn the relay-related information of each candidate UE or related information for restricting whether the first UE can select a candidate UE as a relay UE, so that the first UE can quickly and accurately select or reselect one UE from the at least one candidate UE as a current relay UE of the first UE, to implement a relay UE selection or reselection process.

The relay UE determining method and the device provided in the embodiments of the present disclosure may be applied to a communications system, and may be applied to a process in which a UE performs relay UE selection or relay UE reselection based on the communications system.

The embodiments of the present disclosure may be applied to various communications systems, such as a 5G communications system, a future evolved system, or another communications system. There may be a plurality of application scenarios, such as a Machine-to-Machine (M2M) scenario, a Device-to-Machine (D2M) scenario, an enhanced Mobile BroadBand (eMBB) scenario, and an ultra-Reliable and Low Latency Communications (uRLLC) scenario. In some embodiments, this may be determined based on an actual use requirement, and is not limited in the embodiments of the present disclosure.

It should be noted that in the embodiments of the present disclosure, the foregoing communications systems may include an LTE communications system, an NR communications system, a subsequent communications system, and the like.

For example, FIG. 1 is a schematic architectural diagram of a communications system according to an embodiment of this application. As shown in FIG. 1, the communications system may include a network device 01, at least one UE 02, and a UE 03.

The network device 01 may be connected to and communicate with the at least one UE 02 (one UE 02 is used as an example in FIG. 1), and the at least one UE 02 may be connected to and communicate with the UE 03.

In this embodiment of the present disclosure, in a scenario, in a case that one or more relay nodes exist between the network device 01 and the UE 03 (for example, one UE 02 in the at least one UE 02 is a relay UE of the UE 03, that is, the network device 01 and the one UE 02 are connected (that is, a communication link exists), and the one UE 02 and the UE 03 are connected), the UE 03 may perform relay UE reselection based on a UE 02 other than the one UE 02 in the at least one UE 02. The UE 03 may be referred to as a remote UE.

It should be noted that the relay UE in this embodiment of the present disclosure may be a UE-to-network relay or a UE-to-UE relay. In the former case, one end of the relay UE is connected to a UE (remote UE) and one end of the relay UE is connected to a network device. In the latter case, two ends of the relay UE are connected to UEs.

In addition, in this embodiment of the present disclosure, the relay UE and the remote UE may use the previous names, and specific names may change. In principle, the remote UE is a UE that needs to communicate with another UE/network device by using a relay. The relay UE is a UE that serves as a relay for communication between the remote UE and the another UE/network device.

In another scenario, in a case that there is no relay UE between the network device 01 and the UE 03, the UE 03 may perform relay UE selection based on the at least one UE 02.

It should be noted that, in this embodiment of the present disclosure, the at least one UE 02 and the UE 03 shown in FIG. 1 may be connected wirelessly. To illustrate a connection relationship between the at least one UE 02 and the UE 03 more clearly, FIG. 1 shows the connection relationship between the at least one UE 02 and the UE 03 by using a solid line. Communication between the at least one UE 02 and the UE 03 may be referred to as sidelink communication.

The UE is a device that provides a user with voice and/or data connectivity, a handheld device that has a wired/wireless connection function, or another processing device connected to a wireless modem. The UE may communicate with one or more core networks by using a Radio Access Network (RAN). The UE may be a mobile terminal, for example, a mobile phone (or referred to as a "cellular" phone) and a computer that has a mobile terminal; or may be a portable, pocket-sized, handheld, computer built-in, or in-vehicle mobile apparatus that exchanges voice and/or data with the RAN, for example, a device such as a Personal Communications Service (PCS) phone, a cordless phone, a Session Initiation Protocol (SIP) phone, a Wireless Local Loop (WLL) station, or a Personal Digital Assistant (PDA). The UE may also be referred to as a user agent, a terminal device, or the like. In an example, in this embodiment of the present disclosure, FIG. 1 shows that the UE is a mobile phone.

The network device may be a base station. The base station is an apparatus that is deployed in an RAN to provide a radio communication function for the UE. The base station may include various forms of macro base stations, micro base stations, relay nodes, access points, or the like. In systems using different radio access technologies, a device with a base station function may have different names. For example, in a third-generation (3G) mobile communications network, the device is referred to as a NodeB. In an LTE system, the device is referred to as an evolved NodeB (eNB or eNodeB). In a fifth-generation (5G) mobile communications network, the device is referred to as a gNB or the like. The name "base station" may vary with evolution of communications technologies.

The relay UE determining method and the device according to the embodiments of the present disclosure are described in detail below with reference to the accompanying drawings and by using embodiments and application scenarios thereof.

Based on the communications system shown in FIG. 1, an embodiment of the present disclosure provides a relay UE determining method. As shown in FIG. 2, the relay UE determining method may include the following step 201 and step 202.

Step 201: A first UE obtains relay-related information corresponding to each candidate UE in at least one candidate UE.

In this embodiment of the present disclosure, the first UE may be a remote UE. The at least one candidate UE is a UE that is to be selected by the first UE as a relay UE of the first UE.

It should be noted that relay-related information corresponding to a candidate UE may be understood as the relay-related information of the candidate UE; or some related information when the candidate UE notifies the first UE that the candidate UE can be a relay UE of which UE, that is, related information used to restrict the remote UE whether the candidate UE can be selected as a relay UE. In addition, the relay-related information may be understood as information used when relay UE selection or relay UE reselection is performed.

Figure 3:
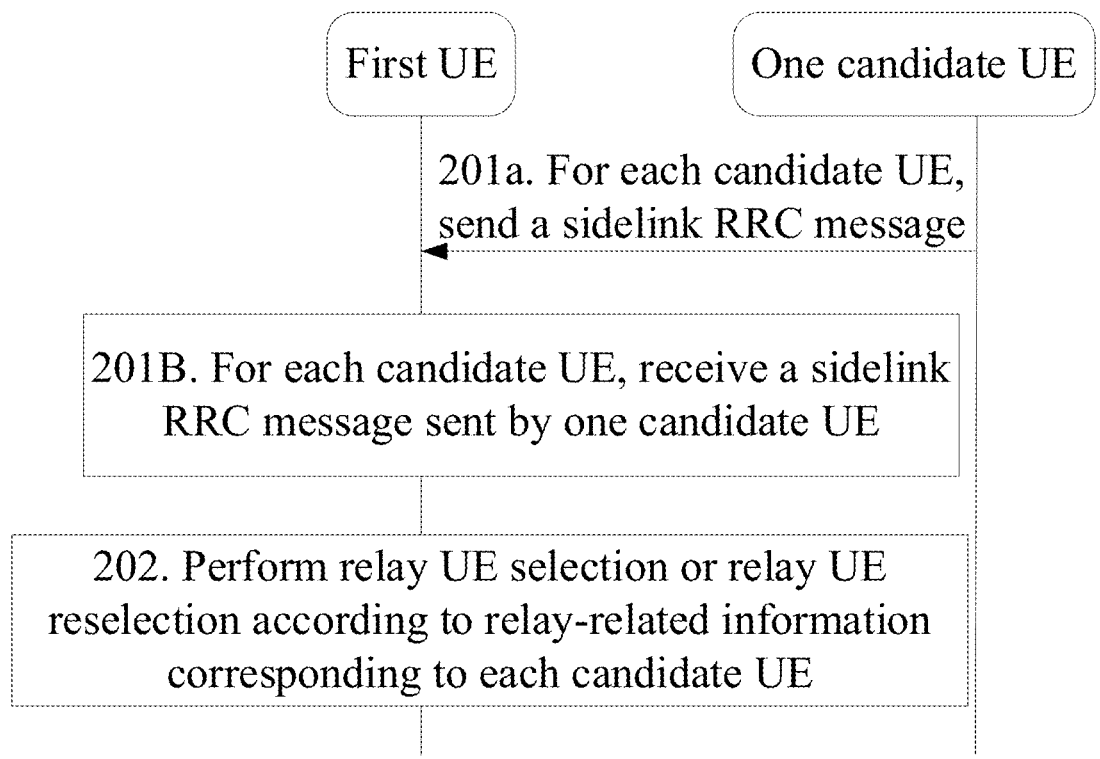
FIG. 3 is a second schematic diagram of a relay UE determining method according to an embodiment of the present disclosure.

For example, in an implementation of this embodiment of the present disclosure, with reference to FIG. 2, as shown in FIG. 3, the foregoing step 201 may be implemented by using the following step 201a and step 201b.

Step 201a: For each candidate UE, one candidate UE sends a sidelink Radio Resource Control (RRC) message to the first UE.

Step 201b: For each candidate UE, the first UE receives the sidelink RRC message sent by the one candidate UE.

In this embodiment of the present disclosure, the sidelink RRC message includes relay-related information corresponding to the one candidate UE.

For example, in this embodiment of the present disclosure, the sidelink RRC message includes at least one of the following: a UE capability message and a sidelink RRC reconfiguration message.

It should be noted that for each candidate UE, the one candidate UE may send the relay-related information corresponding to the one candidate UE to the first UE through a PC5 RRC interaction process (that is, a sidelink RRC message). In some embodiments, the one candidate UE may send the relay-related information corresponding to the one candidate UE to the first UE by using a sidelink RRC reconfiguration message, a UE capability message, and/or another newly defined RRC message. Which information in the relay-related information is sent by using these messages is described in the following embodiments, and details are not described herein.

For example, in another implementation of this embodiment of the present disclosure, for each candidate UE, the relay-related information corresponding to the one candidate UE is obtained in any one of the following manners: being obtained from a broadcast message or a sidelink RRC message sent by the one candidate UE, being configured by a network device, being preconfigured by a network device, being preconfigured at delivery, and being specified by a protocol.

For example, in this embodiment of the present disclosure, for each candidate UE in the at least one candidate UE, the relay-related information corresponding to the one candidate UE includes at least one of the following: first target information, first configuration information, and second configuration information.

The first target information is information about the one candidate UE; the first configuration information is used to indicate that the one candidate UE is a UE or a UE type that can provide a relay service; and the second configuration information is used to indicate a threshold for triggering relay UE selection or relay UE reselection.

It should be noted that, that the one candidate UE is a UE that can provide a relay service (for example, a UE-2) may be understood as: the one candidate UE can be a relay UE of the UE-2. The first configuration information may be understood as some related information when the one candidate UE notifies the first UE that the candidate UE can be a relay UE of which UE. The UE type is described in the following embodiment, and details are not described herein.

For example, in this embodiment of the present disclosure, the first target information includes at least one of the following: capability information, a first target identifier, a first relay identifier, first RRC state information, first resource allocation mode information, a first cell identifier, a first Radio access network Notification Area (RNA) identifier, a first Public Land Mobile Network (PLMN) identifier, first indication information, a first quantity, a second quantity, second indication information, and third indication information.

The capability information is used to indicate whether the one candidate UE can be a relay UE, the first target identifier is used to indicate the one candidate UE, the first relay identifier is an identifier of the one candidate UE for relay pairing, the first RRC state information is used to indicate an RRC state of the one candidate UE, the first resource allocation mode information is used to indicate a resource allocation mode of the one candidate UE, the first cell identifier is used to indicate a cell in which the one candidate UE is located, the first RNA identifier is used to indicate an RNA in which the one candidate UE is located, the first PLMN identifier is used to indicate a PLMN in which the one candidate UE is located, the first indication information is used to indicate a base station connection architecture corresponding to the one candidate UE, the first quantity is a current quantity of UEs for which the one candidate UE can be a relay UE, the second quantity is a total quantity of UEs for which the one candidate UE can be a relay UE, the second indication information is used to indicate whether a PC5-RRC connection exists between the one candidate UE and the first UE, and the third indication information is used to indicate whether a PC5-S connection exists between the one candidate UE and the first UE.

It can be understood that, in one manner, for each candidate UE, the one candidate UE may indicate some information (that is, the first target information) of the one candidate UE to the remote UE, so that the remote UE can directly determine, based on the information, whether to select or reselect the one candidate UE as a relay UE.

For example, in this embodiment of the present disclosure, the first target identifier may be various RNTIs (an RNTI, a C-RNTI, an I-RNTI, a T-RNTI, or the like), an IMSI, a GUTI, a 5G-S-TMSI, or the like. The first relay identifier may be an identifier configured by the network device, preconfigured by the network device, or specified by the protocol for relay pairing.

For example, in this embodiment of the present disclosure, the RRC state may include at least one of the following: an RRC connected state, an idle state, an inactive state, and the like.

It should be noted that the total quantity of UEs for which the one candidate UE can be a relay UE means that a total quantity of UEs for which the one candidate UE may serve as a relay, and the current quantity of UEs for which the one candidate UE can be a relay UE means a quantity that can be supported when a connection is established. For example, if one candidate UE can be relays of a total of three UEs, and currently has served as relays of two UEs, a current quantity as relay UEs herein is 1.

For example, in this embodiment of the present disclosure, a cell identifier (for example, the first cell identifier)

may include at least one of the following: a Physical Cell Identification (PCI), a Cell Global Identifier (CGI), and frequency information.

For example, in this embodiment of the present disclosure, the base station connection architecture may be a multi-Radio Access Technology (RAT) dual connectivity (Multi-RAT Dual Connectivity (MRDC)) architecture.

For example, in this embodiment of the present disclosure, the MRDC architecture may include at least one of the following: Evolved-UTRA-NR Dual Connectivity (EN-DC), NR-Evolved-UTRA Dual Connectivity (NE-DC), NR-NR Dual Connectivity (NR-DC), NG-RAN Evolved-UTRA-NR Dual Connectivity (NG EN-DC), and the like.

For example, in this embodiment of the present disclosure, the PLMN may include at least one of the following: a Home Public Land Mobile Network (HPLMN), a Virtual Public Land Mobile Network (VPLMN), a serving Public Land Mobile Network (serving PLMN), and the like.

For example, in this embodiment of the present disclosure, that a PC5-RRC connection exists between the one candidate UE and the first UE includes at least one of the following: the first UE includes context information of the one candidate UE, the first UE receives a PC5-RRC reconfiguration message of the one candidate UE, the first UE sends a PC5-RRC reconfiguration complete message to the one candidate UE, an established data bearer (Data Resource Bearer (DRB)) exists between the first UE and the one candidate UE, and an established signaling bearer (Signaling Radio Bearer (SRB)) exists between the first UE and the one candidate UE.

For example, in this embodiment of the present disclosure, that a PC5-S connection exists between the one candidate UE and the first UE includes at least one of the following: the first UE includes a link IDentifier (link ID) of a unicast connection to the one candidate UE, the first UE includes a target node IDentifier (destination ID) of the unicast connection to the one candidate UE, and the first UE includes a source node IDentifier (source ID) of the unicast connection to the one candidate UE.

In this embodiment of the present disclosure, for each candidate UE, if the first target information of the one candidate UE is related information of the one candidate UE, the first UE may determine whether the related information of the one candidate UE meets a preset condition (that is, a first preset condition described in the following embodiment), and if the preset condition is met, determine the one candidate UE as a relay UE to access the relay UE.

For example, the one candidate UE sends the first target identifier (for example, an identifier 1) of the one candidate UE to the first UE. If the first UE may determine, according to a preconfigured condition (for example, the first UE may select UEs whose identifiers are 1, 2, and 3 as relay UEs), that the first target identifier meets the preconfigured condition, the first UE may determine the one candidate UE as a relay UE to access the relay UE.

For example, in this embodiment of the present disclosure, the first configuration information includes at least one of the following: a first identifier range, a relay identifier range, second RRC state information, second resource allocation mode information, a cell identifier range, an RNA identifier range, a PLMN identifier range, and a target QoS-related information.

The first identifier range is used to indicate at least one second UE, and the one candidate UE can be a relay UE of the at least one second UE; the relay identifier range includes an identifier of at least one third UE for relay pairing, and the one candidate UE can be a relay UE of the at least one third UE; the second RRC state information is used to indicate a target RRC state, and the one candidate UE can be a relay UE of UE whose RRC state is the target RRC state; the second resource allocation mode information is used to indicate a target resource allocation mode, and the one candidate UE can be a relay UE of UE whose resource allocation mode is the target resource allocation mode; the cell identifier range is used to indicate at least one cell, and the one candidate UE can be a relay UE of UE that is currently in any cell in the at least one cell; the RNA identifier range is used to indicate at least one RNA, and the one candidate UE can be a relay UE of UE that is currently in any RNA in the at least one RNA; the PLMN identifier range is used to indicate at least one PLMN, and the one candidate UE can be a relay UE of UE that is currently in any PLMN in the at least one PLMN; and the target QoS-related information is used to indicate a target QoS condition, and the one candidate UE can be a relay UE of UE whose QoS-related information meets the target QoS condition.

It can be understood that, in one manner, for each candidate UE, the one candidate UE may indicate, to the remote UE, some information supported by the one candidate UE (that is, the first configuration information, or in other words, some information about a UE that can provide a relay service), so that the remote UE can determine, based on the information, whether the one candidate UE is a UE that can provide a relay service, to determine whether to select or reselect the one candidate UE as a relay UE.

It should be noted that a range (for example, the first identifier range, the relay identifier range, the cell identifier range, and the RNA identifier range) in this embodiment of the present disclosure may be understood as a specific value (that is, an identifier value) or a specific range (that is, a range corresponding to a plurality of identifier values).

For example, in this embodiment of the present disclosure, the QoS-related information includes at least one of the following: a PQI, a PC5 Packet Flow Identifier (PFI), a QoS parameter, a PC5 flow bit rate, and a QoS range.

For example, in this embodiment of the present disclosure, the PC5 flow bit rate includes at least one of the following: a Guaranteed Flow Bit Rate (GFBR) and a Maximum Flow Bit Rate (MFBR).

It should be noted that the PQI may also be referred to as a Vehicle quality of Service indication (VQI), and both the PQI and the VQI are PC5 quality of service identifiers. The QoS condition may also be referred to as a QoS requirement. For example, that the QoS-related information meets the QoS condition may be understood that: if one candidate UE supports PQI=1 and PQI=2, and a QoS requirement of a remote UE (for example, the first UE) is PQI=1, QoS-related information (PQI) of the first UE meets the QoS condition corresponding to the one candidate UE; or if a QoS range supported by one candidate UE is 500 m, and a QoS requirement of a remote UE (for example, the first UE) is 500 m or 300 m, QoS-related information (QoS range) of the first UE meets a QoS condition corresponding to the one candidate UE.

In this embodiment of the present disclosure, for each candidate UE, the first configuration information of the one candidate UE is the relay-related information corresponding to the one candidate UE, that is, some related information when the one candidate UE informs the first UE that the one candidate UE can be a relay UE of which UE, the first UE may determine whether the first UE meets a preset condition (that is, a second preset condition described in the following embodiment), and if the preset condition is met, determines that the one candidate UE as a relay UE to access the relay UE.

For example, the one candidate UE informs the first UE that the one candidate UE can be relay UEs of UEs whose identifiers are x, y, and z. If the first target identifier of the first UE is the identifier X, the first UE may determine that the first UE meets the preset condition, and the first UE may determine the one candidate UE as a relay UE to access the relay UE. If the first target identifier of the first UE is an identifier m, the first UE may determine that the first UE does not meet the preset condition, and the first UE does not access the one candidate UE.

For example, in this embodiment of the present disclosure, the second configuration information includes at least one of the following: a Channel Busy Ratio (CBR) threshold, a first reference signal measurement threshold of a Uu interface, and a second reference signal measurement threshold of a PC5 interface.

It should be noted that the first reference signal measurement threshold of the Uu interface may be a reference signal measurement threshold of a Uu interface of a candidate UE, or a reference signal measurement threshold of a Uu interface of a remote UE (for example, the first UE).

It can be understood that, in one manner, for each candidate UE, the one candidate UE may indicate, to the remote UE, a threshold (that is, the second configuration information) corresponding to the one candidate UE for triggering relay UE selection or reselection, so that the remote UE can determine, based on these thresholds, whether to trigger relay UE selection or reselection.

The following describes, in an implementation, a solution in which for relay-related information exchanged in a PC5-RRC process (a UE capability message or a sidelink RRC reconfiguration message), that is, one candidate UE sends, by using the sidelink RRC reconfiguration message or the UE capability message, relay-related information corresponding to the one candidate UE to another UE (for example, the first UE).

Manner 1: Two UEs (for example, a UE-1 and a UE-2) interact with a relay-related capability in capability interaction. Subsequently, relay UE selection or relay UE reselection may be determined based on the interacted capability in this case.

Step 11: The UE-1 sends a sidelink RRC message to the UE-2, where the message is a UE capability message.

In step 11, the UE capability message may include at least one of the following: information about whether the UE-1 supports relay communication, relay configuration information supported by the UE-1 (for example, the first configuration information in the foregoing embodiment), and a request message for a capability of the UE-2.

The information about whether relay communication is supported may include at least one of the following: information about whether of being a remote UE and information about whether of being a relay UE.

The relay configuration information may include at least one of the following: a total quantity (for example, the second quantity in the foregoing embodiment) of being a relay UE, a current quantity (for example, the first quantity in the foregoing embodiment) of being a relay UE, and a type of a UE that can be a relay UE.

The type of the UE that can be a relay UE may include at least one of the following: an ID value or range of the UE (for example, the first identifier range in the foregoing embodiment), an ID value or range of a relay (for example, the relay identifier range in the foregoing embodiment), RRC state information of the UE (for example, the second RRC state information in the foregoing embodiment), resource allocation mode information of the UE (for example, the second resource allocation mode information in the foregoing embodiment), and QoS-related information of the UE (for example, the target QoS-related information in the foregoing embodiment). The ID value or range of the UE may indicate that the UE-1 can be only a relay UE of a UE whose UE ID is a specific value or range. The ID value or range of the relay may indicate that the UE-1 can be only a relay UE of a UE whose relay ID is a value or range. The RRC state information of the UE may indicate that the UE-1 can be only a relay UE of a UE whose RRC state is an RRC connected state, an idle state, or an inactive state. The resource allocation mode information of the UE indicates that the UE-1 can be only a relay UE of a UE whose resource allocation mode is a mode-1, a mode-2, or both a mode-1 and a mode-2, where the mode-2 may include at least one of the following: a mode 2a, a mode 2b, a mode 2c, and a mode 2d. The QoS-related information of the UE may indicate that the UE can be a relay UE of a UE whose QoS-related information meets a QoS condition/requirement.

The request message for the capability of the UE-2 is used to request the UE-2 to feed back whether the UE-2 supports relay communication and relay configuration information supported by the UE-2.

It should be noted that, for the UE-1 and the UE-2, the relay configuration information may be sent and received by using a sidelink RRC message, may be configured by a base station, may be preconfigured by a base station, or may be stipulated by a protocol.

Step 12: The UE-2 sends a sidelink RRC message to the UE-1, where the message is a UE capability message.

In step 12, the UE capability message may include at least one of the following: information about whether the UE-2 supports relay communication and relay configuration information supported by the UE-2.

It should be noted that for a description of the information about whether the UE-2 supports relay communication and the relay configuration information supported by the UE-2, refer to the descriptions in step 1 in the foregoing embodiment. Details are not described herein again.

Manner 2: In addition to an interaction capability, some specific capability-related information may be interacted in a reconfiguration message. During capability interaction, two UEs may mutually notify each other of whether relay communication is supported, and a UE-ID that is supported in the reconfiguration message is configured. For example, if the UE-1 notifies that a UE ID supported by the UE-2 is X, the UE-1 cannot be a relay UE of the UE-2 if an ID of the UE-2 is not X.

Step 21: The UE-1 sends a sidelink RRC message to the UE-2, where the message is a UE capability message.

In step 21, the UE capability message may include at least one of the following: information about whether the UE-1 supports relay communication and a request message for a capability of the UE-2.

Step 22: The UE-2 sends a sidelink RRC message to the UE-1, where the message is a UE capability message.

In step 22, the UE capability message may include at least one of the following: information about whether the UE-2 supports relay communication and relay configuration information supported by the UE-2.

Step 23: The UE-1 sends a sidelink RRC message to the UE-2, where the message is a sidelink RRC reconfiguration message.

In step 23, the sidelink RRC reconfiguration message includes the relay configuration information supported by the UE-1.

It should be noted that the UE capability message in step 21 and the sidelink RRC reconfiguration message in step 23 may be multiplexed in a same message (for example, a same sidelink RRC message). In this case, step 21 and step 23 are simultaneously performed.

Step 24: The UE-2 sends a sidelink RRC reconfiguration complete message or a sidelink RRC reconfiguration failure message to the UE-1.

It should be noted that for a description of the information about whether the UE-1 supports relay communication, the request message for the capability of the UE-2, the information about whether the UE-2 supports relay communication, and the relay configuration information supported by the UE-2, refer to the descriptions in manner 1 of the foregoing embodiment. Details are not described herein again.

Manner 3: In addition to interaction capability information, other parameters for determining relay UE selection and relay UE reselection may be interacted, such as a CBR threshold and a reference signal measurement threshold of a Uu interface.

Step 31: The UE-1 sends a sidelink RRC message to the UE-2, where the message is a UE capability message.

In step 31, the UE capability message may include at least one of the following: information about whether the UE-1 supports relay communication, relay configuration information supported by the UE-1, and a request message for a capability of the UE-2.

Step 32: The UE-2 sends a sidelink RRC message to the UE-1, where the message is a UE capability message.

In step 32, the UE capability message may include at least one of the following: information about whether the UE-2 supports relay communication and relay configuration information supported by the UE-2.

Step 33: The UE-1 sends a sidelink RRC message to the UE-2, where the message is a sidelink RRC reconfiguration message.

In step 33, the sidelink RRC reconfiguration message includes at least one of the following: a CBR threshold for relay communication (for example, the CBR threshold in the foregoing embodiment), a sidelink reference signal measurement threshold for relay communication, a Uu reference signal measurement threshold for relay communication, a cell ID and/or a PLMN identifier of the UE-1, and an indication of a base station connection architecture indication of the UE-1.

Step 34: The UE-2 sends a sidelink RRC reconfiguration complete message or a sidelink RRC reconfiguration failure message to the UE-1.

It should be noted that for a description of the information about whether the UE-1 supports relay communication, the relay configuration information supported by the UE-1, the request message for the capability of the UE-2, the information about whether the UE-2 supports relay communication, and the relay configuration information supported by the UE-2, refer to the descriptions in manner 1 of the foregoing embodiment. Details are not described herein again.

Manner 4: Configuring relay-related information by using an RRC reconfiguration message may be a separate process, and may not necessarily be performed after a capability message. In a communication process, the UE-1 may send an RRC reconfiguration message to the UE-2 separately.

Step 41: The UE-1 sends a sidelink RRC message to the UE-2, where the message is a sidelink RRC reconfiguration message.

In step 41, the sidelink RRC reconfiguration message includes at least one of the following: a CBR threshold for relay communication (for example, the CBR threshold in the foregoing embodiment), a sidelink reference signal measurement threshold for relay communication, a Uu reference signal measurement threshold for relay communication, a cell ID and/or a PLMN identifier of the UE-1, an indication of a base station connection architecture of the UE-1, relay configuration information supported by the UE-1, and a request message for a capability of the UE-2.

Step 42: The UE-2 sends a sidelink RRC reconfiguration complete message or a sidelink RRC reconfiguration failure message to the UE-1.

It should be noted that for a description of the relay configuration information supported by the UE-1 and the request message for the capability of the UE-2, refer to the descriptions in manner 1 of the foregoing embodiment. Details are not described herein again.

Step 202: The first UE performs relay UE selection or relay UE reselection according to the relay-related information corresponding to each candidate UE.

In this embodiment of the present disclosure, in an NR system, the first UE may determine a target UE from the at least one candidate UE according to the relay-related information corresponding to each candidate UE, and perform relay UE selection or relay UE reselection based on the target UE, to access a selected or reselected relay UE.

It should be noted that each candidate UE in the at least one candidate UE may be used as a relay UE of the first UE, and the first UE may preferentially select one UE from the at least one candidate UE as a relay UE of the first UE according to the relay-related information corresponding to each candidate UE.

Figure 4:
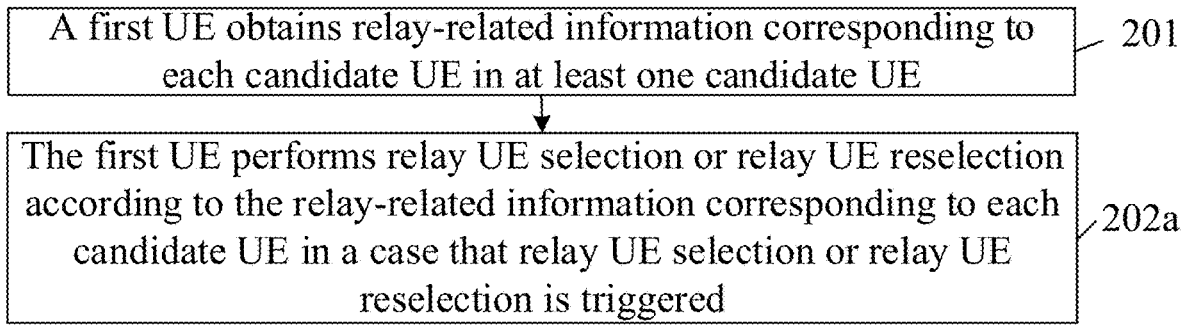
FIG. 4 is a third schematic diagram of a relay UE determining method according to an embodiment of the present disclosure.

For example, in this embodiment of the present disclosure, with reference to FIG. 2, as shown in FIG. 4, the foregoing step 202 may be implemented by using the following step 202a.

Step 202a: The first UE performs relay UE selection or relay UE reselection according to the relay-related information corresponding to each candidate UE in a case that relay UE selection or relay UE reselection is triggered.

In this embodiment of the present disclosure, the first UE may trigger relay UE selection or relay UE reselection; or a current relay UE of the first UE may trigger the first UE to perform relay UE selection or relay UE reselection.

For example, in an implementation of this embodiment of the present disclosure, before step 202a, the relay UE determining method provided in this embodiment of the present disclosure may further include the following step 301.

Step 301: The first UE triggers relay UE selection in a case that second target information meets a third preset condition.

In this embodiment of the present disclosure, the second target information includes at least one of the following: a first measurement report of a fourth UE, a first measurement result of the first UE, and a first CBR of the first UE.

The first measurement report is obtained after the fourth UE performs measurement based on measurement configuration information sent by the first UE, the first measurement result is obtained after the first UE measures a reference signal of a Uu interface of the first UE, and the fourth UE is a UE in the at least one candidate UE.

It can be understood that, in one manner, a candidate UE may perform measurement based on the measurement configuration information sent by the first UE, and report a result obtained through measurement to the first UE in a form of a measurement report, so that the first UE can determine, based on the measurement report, whether to trigger relay UE selection. In another manner, when performing relay UE selection as required, the first UE may measure the reference signal of the Uu interface of the first UE, and determine, according to a result obtained through measurement, whether to trigger relay UE selection. In still another manner, when performing relay UE selection as required, the first UE may obtain a CBR of the first UE, to determine, according to the CBR, whether to trigger relay UE selection.

For example, in this embodiment of the present disclosure, the third preset condition includes at least one of the following: the first measurement report is reported based on a first preset event, a measurement value in the first measurement report is greater than or equal to the second reference signal measurement threshold, the first measurement result is less than or equal to the first reference signal measurement threshold, and the first CBR is less than or equal to the CBR threshold.

It should be noted that, that the first measurement report is reported based on a first preset event may be understood as: a measurement report event corresponding to a first measurement report of a candidate UE is the first preset event (for example, X2). The measurement value in the first measurement report may be a measurement value obtained after a candidate UE measures a reference signal of a PC5 interface (that is, an interface between the candidate UE and the first UE). The second reference signal measurement threshold herein may be a reference signal measurement threshold of the PC5 interface between the candidate UE and the first UE.

For example, in this embodiment of the present disclosure, the measurement configuration information includes at least one of the following: a measurement object (measurement objects), a measurement reporting configuration (reporting configurations), a measurement identifier (measurement identifiers), a measurement quantity configuration (quantity configurations), and a measurement gap (measurement gaps).

For example, in this embodiment of the present disclosure, two UEs (for example, a candidate UE and the first UE) may send a sidelink measurement-related configuration (that is, measurement configuration information) by using a PC5-RRC message, to measure and trigger relay UE selection or reselection.

For example, in this embodiment of the present disclosure, the measurement reporting configuration is used to configure periodic measurement or event-based measurement.

For example, in this embodiment of the present disclosure, the measurement reporting configuration includes one piece of indication information, and the one piece of indication information is used to instruct a candidate UE to perform periodic measurement or event-based measurement. It can be understood that if the measurement reporting configuration is used to configure periodic measurement, the candidate UE may periodically perform measurement and reporting. If the measurement reporting configuration is used to configure event-based measurement, the candidate UE may perform measurement and reporting based on an event.

For example, in this embodiment of the present disclosure, the measurement reporting configuration includes an event configuration for relay selection. For example, an event X1 indicates that when a reference signal measurement result on a sidelink is less than or equal to a threshold (for example, A), a receive end reports the measurement result to a transmit end, and the transmit end triggers a relay reselection process based on the measurement result and/or another determining condition. An event X2 indicates that when a reference signal measurement result on a sidelink is greater or equal to a threshold (for example, B), a receive end reports the measurement result to a transmit end, and the transmit end triggers a relay selection process based on the measurement result and/or another determining condition.

For example, in this embodiment of the present disclosure, the another determining condition may be a determining condition of the Uu interface or another defined condition, for example, whether a reference signal measurement result of the Uu interface is less than or equal to a threshold (for example, A2), or whether an identifier of the receive end is a specific value.

For example, in another implementation of this embodiment of the present disclosure, before step 202*a*, the relay UE determining method provided in this embodiment of the present disclosure may further include the following step 401.

Step 401: The first UE triggers relay UE reselection in a case that third target information meets a fourth preset condition.

In this embodiment of the present disclosure, the third target information includes at least one of the following: a second measurement report of a fifth UE, a first measurement result of the first UE, and a first CBR of the first UE.

The second measurement report is obtained after the fifth UE performs measurement based on measurement configuration information sent by the first UE, the first measurement result is obtained after the first UE measures a reference signal of a Uu interface of the first UE, and the fifth UE is a current relay UE of the first UE.

It can be understood that, in one manner, the current relay UE of the first UE may perform measurement based on the measurement configuration information sent by the first UE, and report a result obtained through measurement to the first UE in a form of a measurement report, so that the first UE can determine, based on the measurement report, whether to trigger relay UE reselection. In another manner, when performing relay UE reselection as required, the first UE may measure the reference signal of the Uu interface of the first UE, and determine, according to a result obtained through measurement, whether to trigger relay UE reselection. In still another manner, when performing relay UE reselection as required, the first UE may obtain a CBR of the first UE, to determine, according to the CBR, whether to trigger relay UE reselection.

For example, in this embodiment of the present disclosure, the fourth preset condition includes at least one of the following: the second measurement report is reported based on a second preset event, a measurement value in the second measurement report is less than or equal to the second reference signal measurement threshold, the first measurement result is less than or equal to the first reference signal measurement threshold, and the first CBR is greater than or equal to the CBR threshold.

It should be noted that the second preset event and the first preset event may be a same event or different events. The measurement value in the second measurement report may be a measurement value obtained after the fifth UE (that is, the current relay UE of the first UE) measures a reference signal of a PC5 interface (that is, an interface between the fifth UE and the first UE). The second reference signal measurement threshold herein may be a reference signal measurement threshold of the PC5 interface between the fifth UE and the first UE.

Figure 5:
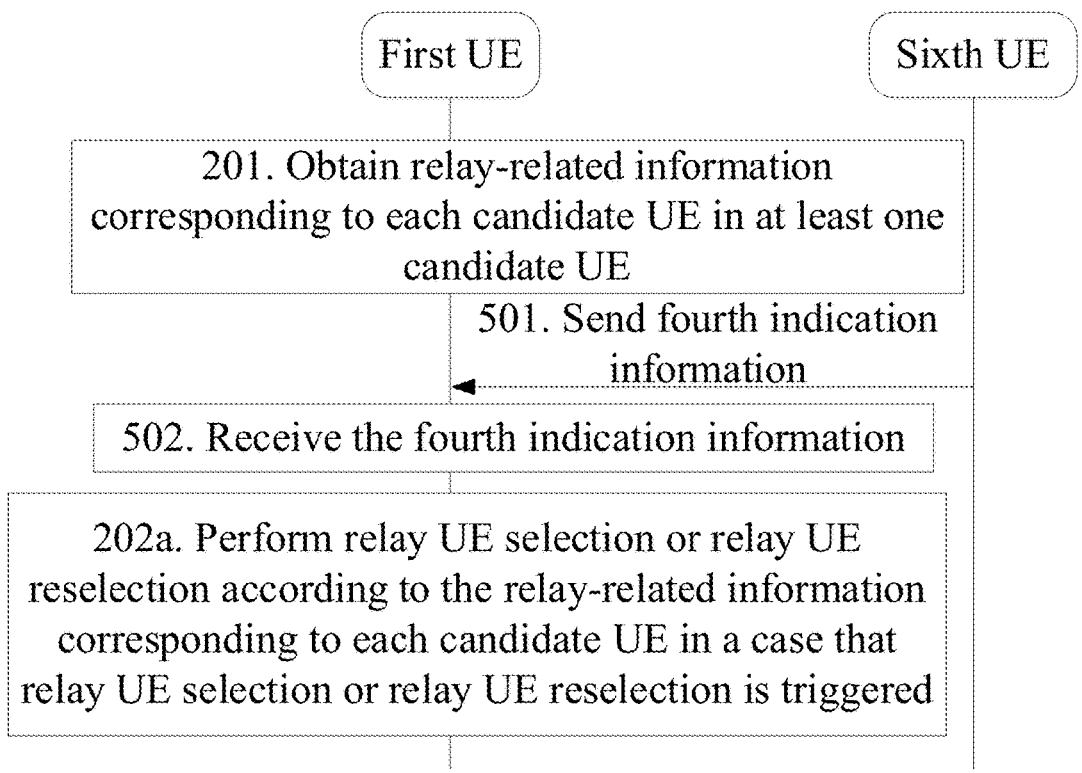
FIG. 5 is a fourth schematic diagram of a relay UE determining method according to an embodiment of the present disclosure.

For example, in still another implementation of this embodiment of the present disclosure, with reference to FIG. 4, as shown in FIG. 5, after step 202a, the relay UE determining method provided in this embodiment of the present disclosure may further include the following step 501 and step 502.

Step 501: A sixth UE sends fourth indication information to the first UE.

Step 502: The first UE receives the fourth indication information sent by the sixth UE.

In this embodiment of the present disclosure, the fourth indication information is used to trigger the first UE to perform relay UE reselection, the sixth UE is a current relay UE of the first UE, and the fourth indication information is sent by the sixth UE in a case that fourth target information meets a fifth preset condition.

The fourth target information includes at least one of the following: a third measurement report of the first UE, a second measurement result of the sixth UE, and a second CBR of the sixth UE; the third measurement report is obtained after the first UE performs measurement based on measurement configuration information sent by the sixth UE, and the second measurement result is obtained after the sixth UE measures a reference signal of a Uu interface of the sixth UE.

It can be understood that in a manner, the current relay UE of the first UE may determine, based on a measurement report sent by the first UE, whether to trigger the first UE to perform relay UE reselection. In another manner, the current relay UE of the first UE may measure a reference signal of a Uu interface of the relay UE, and determine, according to a result obtained through measurement, whether to trigger relay UE reselection. In still another manner, the current relay UE of the first UE may obtain a CBR of the relay UE, to determine, according to the CBR, whether to trigger relay UE reselection.

For example, in this embodiment of the present disclosure, the fifth preset condition includes at least one of the following: the third measurement report is reported based on a third preset event, a measurement value in the third measurement report is less than or equal to the second reference signal measurement threshold, the second measurement result is greater than or equal to the first reference signal measurement threshold, and the second CBR is greater than or equal to the CBR threshold.

It should be noted that the measurement value in the third measurement report may be a measurement value obtained after the first UE measures a reference signal of a PC5 interface (that is, an interface between the first UE and the sixth UE (that is, the current relay UE of the first UE)). The second reference signal measurement threshold herein may be a reference signal measurement threshold of the PC5 interface between the first UE and the sixth UE.

Figure 6:
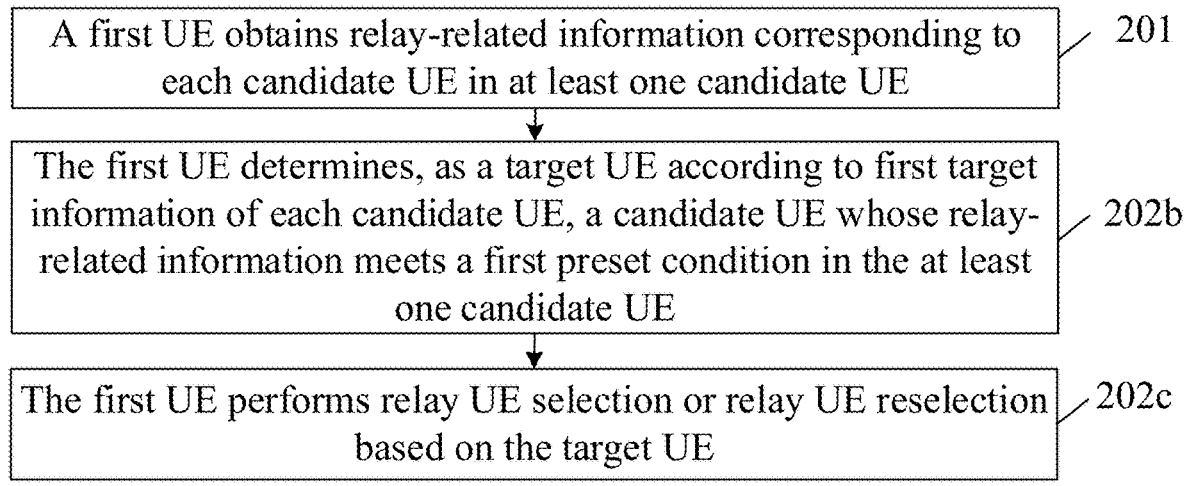
FIG. 6 is a fifth schematic diagram of a relay UE determining method according to an embodiment of the present disclosure.

For example, in an implementation of this embodiment of the present disclosure, with reference to FIG. 2, as shown in FIG. 6, the foregoing step 202 may be implemented by using the following step 202b and step 202c.

Step 202b: The first UE determines, as a target UE according to first target information of each candidate UE, a candidate UE whose relay-related information meets a first preset condition in the at least one candidate UE.

In this embodiment of the present disclosure, after a remote UE or a current relay UE of a remote UE triggers relay UE selection or relay UE reselection, the remote UE may select, as a relay UE, a UE that meets the first preset condition.

For example, in this embodiment of the present disclosure, the first preset condition includes at least one of the following: a candidate UE can be a relay UE, a first target identifier of a candidate UE is within a first preset range, a first relay identifier of a candidate UE is within a second preset range or is the same as a relay identifier of the first UE, an RRC state of a candidate UE is a preset state, a resource allocation mode of a candidate UE is a preset mode, a first cell identifier of a candidate UE is within a third preset range or is the same as a cell identifier of the first UE, a first RNA identifier of a candidate UE is within a fourth preset range or is the same as an RNA identifier of the first UE, a first PLMN identifier of a candidate UE is a preset PLMN identifier or is the same as a PLMN identifier of the first UE, a base station connection architecture of a candidate UE is a preset connection architecture or is the same as a base station connection architecture of the first UE, a first quantity of candidate UEs is less than a first preset threshold, a second quantity of candidate UEs is less than a second preset threshold, a PC5-RRC connection exists between a candidate UE and the first UE, and a PC5-S connection exists between a candidate UE and the first UE.

Step 202c: The first UE performs relay UE selection or relay UE reselection based on the target UE.

It can be understood that the first UE has no relay UE, and the first UE may select one UE (the candidate UE whose relay-related information meets the first preset condition) from the at least one UE to access the one UE; or if the first UE already has one relay UE, the first UE may re-select one UE from the at least one UE to access the one UE.

Figure 7:
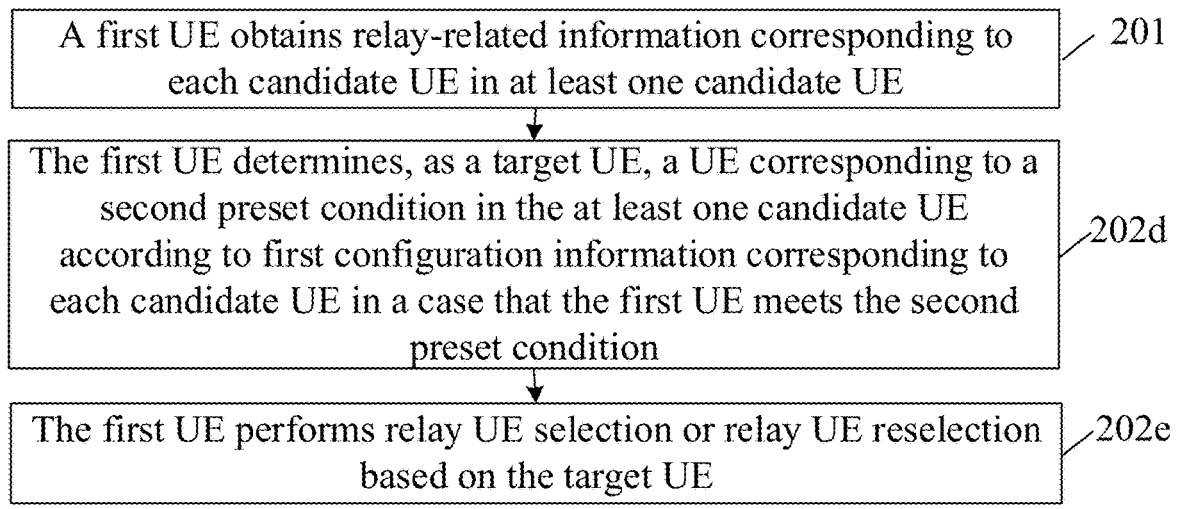
FIG. 7 is a sixth schematic diagram of a relay UE determining method according to an embodiment of the present disclosure.

For example, in another implementation of this embodiment of the present disclosure, with reference to FIG. 2, as shown in FIG. 7, the foregoing step 202 may be implemented by using the following step 202d and step 202e.

Step 202d: The first UE determines, as a target UE, a UE corresponding to a second preset condition in the at least one candidate UE according to first configuration information corresponding to each candidate UE in a case that the first UE meets the second preset condition.

In this embodiment of the present disclosure, for each candidate UE, the first UE may determine, according to the first configuration information corresponding to the one candidate UE, that the one candidate UE can be a relay UE of which UE, to determine whether the one candidate UE can be a relay UE of the first UE.

For example, in this embodiment of the present disclosure, the second preset condition includes at least one of the following: a second target identifier of the first UE is within the first identifier range, a relay identifier of the first UE is within the relay identifier range, an RRC state of the first UE is the target RRC state, a resource allocation mode of the first UE is the target resource allocation mode, a second cell identifier of the first UE is within the cell identifier range, a second RNA identifier of the first UE is within the RNA identifier range, a second PLMN identifier of the first UE is within the PLMN identifier range, and QoS-related information of the first UE meets the target QoS condition. The second target identifier is used to indicate the first UE, the second cell identifier is used to indicate a cell in which the first UE is located, the second RNA identifier is used to indicate an RNA in which the first UE is located, and the second PLMN identifier is used to indicate a PLMN in which the first UE is located.

Step 202e: The first UE performs relay UE selection or relay UE reselection based on the target UE.

For example, when the UE-1 can be used as a relay UE for communication, and/or an identifier of the UE-1 is a specific value X, and/or a relay identifier of the UE-1 is a specific value X, and/or an RRC state of the UE-1 is a specific state Y, and/or a resource allocation mode of the UE-1 is a specific mode Z, and/or a cell identifier of the UE-1 is M (or the cell identifier of the UE-1 is the same as a cell identifier of a remote UE (for example, the first UE)), and/or a relay identifier of the UE-1 is N (or the relay identifier of the UE-1 is the same as a relay identifier of the remote UE), and/or a PLMN identifier of the UE-1 is B (or the PLMN identifier of the UE-1 is the same as a PLMN identifier of the remote UE), and/or a base station connection architecture of the UE-1 is V (or the connection architecture of the UE-1 is the same as a base station connection architecture of the remote UE), and/or a total quantity that the UE-1 can be a relay is less than or equal to X1, and/or a current quantity that the UE-1 can be a relay (that is, a difference between a total quantity of relays and a quantity of connected remote UEs) is less than or equal to X2, and/or a PC5-RRC connection exists between the UE-1 and the remote UE, and/or a PC5-S connection exists between the UE-1 and the remote UE, and/or QoS-related information supported by the UE-1 meets a QoS requirement of the remote UE, the first UE may determine the UE-1 as the target UE (that is, the relay UE of the first UE).

According to the relay UE determining method provided in this embodiment of the present disclosure, a first UE may perform relay UE selection or relay UE reselection according to obtained relay-related information corresponding to each candidate UE in at least one candidate UE. In this solution, the first UE can learn the relay-related information of each candidate UE or related information for restricting whether the first UE can select a candidate UE as a relay UE, so that the first UE can quickly and accurately select or reselect one UE from the at least one candidate UE as a current relay UE of the first UE, to implement a relay UE selection or reselection process.

Figure 8:
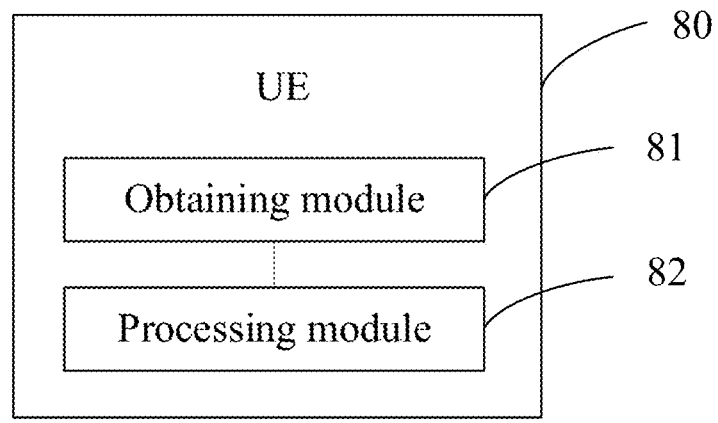
FIG. 8 is a first schematic structural diagram of a UE according to an embodiment of the present disclosure.

FIG. 8 is a schematic structural diagram of a UE according to an embodiment of the present disclosure. The UE is the first UE in the foregoing method embodiment. As shown in FIG. 8, a UE 80 provided in this embodiment of the present disclosure includes an obtaining module 81 and a processing module 82.

The obtaining module 81 is configured to obtain relay-related information corresponding to each candidate UE in at least one candidate UE; and the processing module 82 is configured to perform relay UE selection or relay UE reselection according to the relay-related information corresponding to each candidate UE obtained by the obtaining module 81.

In an implementation, relay-related information corresponding to one candidate UE includes at least one of the following: first target information, first configuration information, and second configuration information; and the first target information is information about the one candidate UE; the first configuration information is used to indicate that the one candidate UE is a UE or a UE type that can provide a relay service; and the second configuration information is used to indicate a threshold for triggering relay UE selection or relay UE reselection.

In an implementation, the first target information includes at least one of the following: capability information, a first target identifier, a first relay identifier, first RRC state information, first resource allocation mode information, a first cell identifier, a first RNA identifier, a first PLMN identifier, first indication information, a first quantity, a second quantity, second indication information, and third indication information. The capability information is used to indicate whether the one candidate UE can be a relay UE, the first target identifier is used to indicate the one candidate UE, the first relay identifier is an identifier of the one candidate UE for relay pairing, the first RRC state information is used to indicate an RRC state of the one candidate UE, the first resource allocation mode information is used to indicate a resource allocation mode of the one candidate UE, the first cell identifier is used to indicate a cell in which the one candidate UE is located, the first RNA identifier is used to indicate an RNA in which the one candidate UE is located, the first PLMN identifier is used to indicate a PLMN in which the one candidate UE is located, the first indication information is used to indicate a base station connection architecture corresponding to the one candidate UE, the first quantity is a current quantity of UEs for which the one candidate UE can be a relay UE, the second quantity is a total quantity of UEs for which the one candidate UE can be a relay UE, the second indication information is used to indicate whether a PC5-RRC connection exists between the one candidate UE and the first UE, and the third indication information is used to indicate whether a PC5-S connection exists between the one candidate UE and the first UE.

In an implementation, that a PC5-RRC connection exists between the one candidate UE and the first UE includes at least one of the following: the first UE includes context information of the one candidate UE, the first UE receives a PC5-RRC reconfiguration message of the one candidate UE, the first UE sends a PC5-RRC reconfiguration complete message to the one candidate UE, an established DRB exists between the first UE and the one candidate UE, and an established SRB exists between the first UE and the one candidate UE.

In an implementation, that a PC5-S connection exists between the one candidate UE and the first UE includes at least one of the following: the first UE includes a link identifier of a unicast connection to the one candidate UE, the first UE includes a target node identifier of the unicast connection to the one candidate UE, and the first UE includes a source node identifier of the unicast connection to the one candidate UE.

In an implementation, the processing module 82 is configured to determine, as a target UE according to first target information of each candidate UE, a candidate UE whose relay-related information meets a first preset condition in the at least one candidate UE; and perform relay UE selection or relay UE reselection based on the target UE.

In an implementation, the first preset condition includes at least one of the following: a candidate UE can be a relay UE, a first target identifier of a candidate UE is within a first preset range, a first relay identifier of a candidate UE is within a second preset range or is the same as a relay identifier of the first UE, an RRC state of a candidate UE is a preset state, a resource allocation mode of a candidate UE is a preset mode, a first cell identifier of a candidate UE is within a third preset range or is the same as a cell identifier of the first UE, a first RNA identifier of a candidate UE is within a fourth preset range or is the same as an RNA identifier of the first UE, a first PLMN identifier of a candidate UE is a preset PLMN identifier or is the same as a PLMN identifier of the first UE, a base station connection architecture of a candidate UE is a preset connection architecture or is the same as a base station connection architecture of the first UE, a first quantity of candidate UEs is less than a first preset threshold, a second quantity of candidate UEs is less than a second preset threshold, a PC5-RRC connection exists between a candidate UE and the first UE, and a PC5-S connection exists between a candidate UE and the first UE.

In an implementation, the first configuration information includes at least one of the following: a first identifier range, a relay identifier range, second RRC state information, second resource allocation mode information, a cell identifier range, an RNA identifier range, a PLMN identifier range, and a target quality of service QoS-related information. The first identifier range is used to indicate at least one second UE, and the one candidate UE can be a relay UE of the at least one second UE; the relay identifier range includes an identifier of at least one third UE for relay pairing, and the one candidate UE can be a relay UE of the at least one third UE; the second RRC state information is used to indicate a target RRC state, and the one candidate UE can be a relay UE of UE whose RRC state is the target RRC state; the second resource allocation mode information is used to indicate a target resource allocation mode, and the one candidate UE can be a relay UE of UE whose resource allocation mode is the target resource allocation mode; the cell identifier range is used to indicate at least one cell, and the one candidate UE can be a relay UE of UE that is currently in any cell in the at least one cell; the RNA identifier range is used to indicate at least one RNA, and the one candidate UE can be a relay UE of UE that is currently in any RNA in the at least one RNA; the PLMN identifier range is used to indicate at least one PLMN, and the one candidate UE can be a relay UE of UE that is currently in any PLMN in the at least one PLMN; and the target QoS-related information is used to indicate a target QoS condition, and the one candidate UE can be a relay UE of UE whose QoS-related information meets the target QoS condition.

In an implementation, the QoS-related information includes at least one of the following: A PQI, a PC5 PFI, a QoS parameter, a PC5 flow bit rate, and a QoS range.

In an implementation, the PC5 flow bit rate includes at least one of the following: a GFBR and an MFBR.

In an implementation, the processing module 82 is configured to: determine, as a target UE, a UE corresponding to a second preset condition in the at least one candidate UE according to first configuration information corresponding to each candidate UE in a case that the first UE meets the second preset condition; and perform relay UE selection or relay UE reselection based on the target UE.

In an implementation, the second preset condition includes at least one of the following: a second target identifier of the first UE is within the first identifier range, a relay identifier of the first UE is within the relay identifier range, an RRC state of the first UE is the target RRC state, a resource allocation mode of the first UE is the target resource allocation mode, a second cell identifier of the first UE is within the cell identifier range, a second RNA identifier of the first UE is within the RNA identifier range, a second PLMN identifier of the first UE is within the PLMN identifier range, and QoS-related information of the first UE meets the target QoS condition. The second target identifier is used to indicate the first UE, the second cell identifier is used to indicate a cell in which the first UE is located, the second RNA identifier is used to indicate an RNA in which the first UE is located, and the second PLMN identifier is used to indicate a PLMN in which the first UE is located.

In an implementation, the second configuration information includes at least one of the following: a CBR threshold, a first reference signal measurement threshold of a Uu interface, and a second reference signal measurement threshold of a PC5 interface.

In an implementation, the processing module 82 is configured to perform relay UE selection or relay UE reselection according to the relay-related information corresponding to each candidate UE in a case that relay UE selection or relay UE reselection is triggered.

Figure 9:
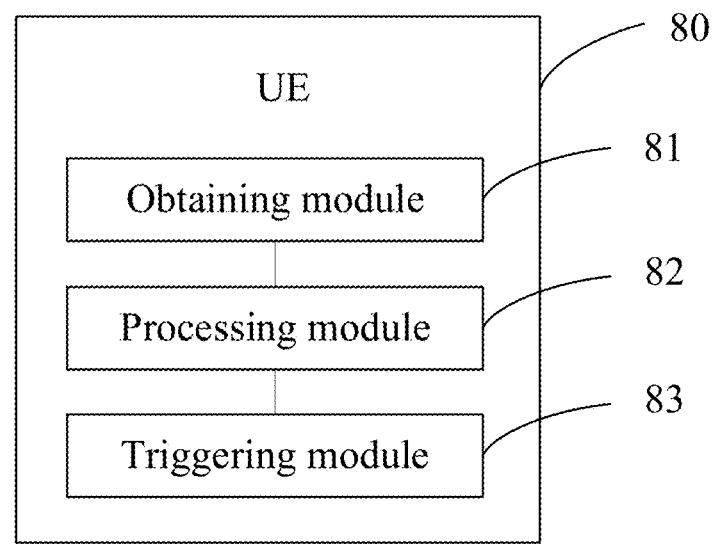
FIG. 9 is a second schematic structural diagram of a UE according to an embodiment of the present disclosure.

In an implementation, with reference to FIG. 8, as shown in FIG. 9, the UE 80 provided in this embodiment of the present disclosure may further include a triggering module 83. The triggering module 83 is configured to: before the processing module 82 performs relay UE selection or relay UE reselection according to the relay-related information corresponding to each candidate UE in a case that relay UE selection or relay UE reselection is triggered, trigger relay UE selection in a case that second target information meets a third preset condition, where the second target information includes at least one of the following: a first measurement report of a fourth UE, a first measurement result of the first UE, and a first CBR of the first UE. The first measurement report is obtained after the fourth UE performs measurement based on measurement configuration information sent by the first UE, the first measurement result is obtained after the first UE measures a reference signal of a Uu interface of the first UE, and the fourth UE is a UE in the at least one candidate UE.

In an implementation, the third preset condition includes at least one of the following: the first measurement report is reported based on a first preset event, a measurement value in the first measurement report is greater than or equal to the second reference signal measurement threshold, the first measurement result is less than or equal to the first reference signal measurement threshold, and the first CBR is less than or equal to the CBR threshold.

In an implementation, with reference to FIG. 8, as shown in FIG. 9, the UE 80 provided in this embodiment of the present disclosure may further include a triggering module 83. The triggering module 83 is configured to: before the processing module 82 performs relay UE selection or relay UE reselection according to the relay-related information corresponding to each candidate UE in a case that relay UE selection or relay UE reselection is triggered, trigger relay UE reselection in a case that third target information meets a fourth preset condition, where the third target information includes at least one of the following: a second measurement report of a fifth UE, a first measurement result of the first UE, and a first CBR of the first UE. The second measurement report is obtained after the fifth UE performs measurement based on measurement configuration information sent by the first UE, the first measurement result is obtained after the first UE measures a reference signal of a Uu interface of the first UE, and the fifth UE is a current relay UE of the first UE.

In an implementation, the fourth preset condition includes at least one of the following: the second measurement report is reported based on a second preset event, a measurement value in the second measurement report is less than or equal to the second reference signal measurement threshold, the first measurement result is less than or equal to the first reference signal measurement threshold, and the first CBR is greater than or equal to the CBR threshold.

Figure 10:
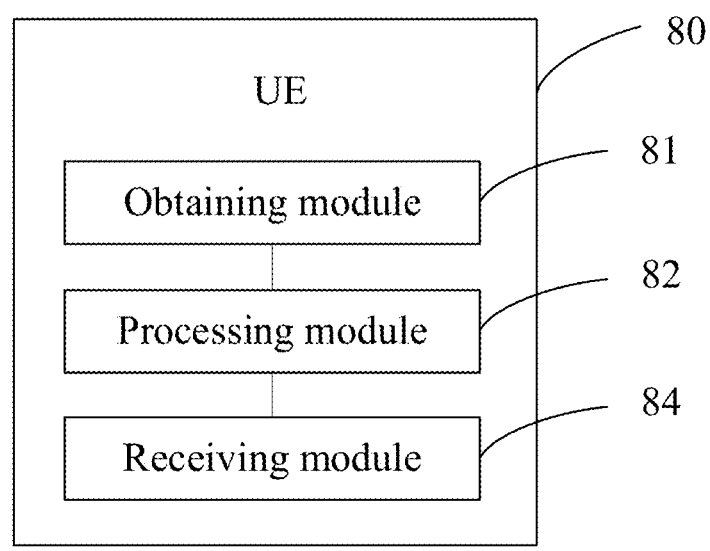
FIG. 10 is a third schematic structural diagram of a UE according to an embodiment of the present disclosure.

In an implementation, with reference to FIG. 8, as shown in FIG. 10, the UE 80 provided in this embodiment of the present disclosure may further include a receiving module

84. The receiving module 84 is configured to: before the processing module 82 performs relay UE selection or relay UE reselection according to the relay-related information corresponding to each candidate UE in a case that relay UE selection or relay UE reselection is triggered, receive fourth indication information sent by a sixth UE, where the fourth indication information is used to trigger the first UE to perform relay UE reselection, the sixth UE is a current relay UE of the first UE, and the fourth indication information is sent by the sixth UE in a case that fourth target information meets a fifth preset condition. The fourth target information includes at least one of the following: a third measurement report of the first UE, a second measurement result of the sixth UE, and a second CBR of the sixth UE; the third measurement report is obtained after the first UE performs measurement based on measurement configuration information sent by the sixth UE, and the second measurement result is obtained after the sixth UE measures a reference signal of a Uu interface of the sixth UE.

In an implementation, the fifth preset condition includes at least one of the following: the third measurement report is reported based on a third preset event, a measurement value in the third measurement report is less than or equal to the second reference signal measurement threshold, the second measurement result is greater than or equal to the first reference signal measurement threshold, and the second CBR is greater than or equal to the CBR threshold.

In an implementation, the measurement configuration information includes at least one of the following: a measurement object, a measurement reporting configuration, a measurement identifier, a measurement quantity configuration, and a measurement gap.

In an implementation, the measurement reporting configuration is used to configure periodic measurement or event-based measurement.

In an implementation, the obtaining module 81 is configured to receive, for each candidate UE, a sidelink RRC message sent by one candidate UE, where the sidelink RRC message includes relay-related information corresponding to the one candidate UE.

In an implementation, the sidelink RRC message includes at least one of the following: a UE capability message and a sidelink RRC reconfiguration message.

In an implementation, for each candidate UE, relay-related information corresponding to one candidate UE is obtained in any one of the following manners: being obtained from a broadcast message or a sidelink RRC message sent by the one candidate UE, being configured by a network device, being preconfigured by a network device, being preconfigured at delivery, and being specified by a protocol.

The UE provided in this embodiment of the present disclosure can implement the processes implemented by the first UE in the forgoing method embodiment. To avoid repetition, details are not described herein again.

According to the UE provided in this embodiment of the present disclosure, the first UE can learn the relay-related information of each candidate UE or related information for restricting whether the first UE can select a candidate UE as a relay UE, so that the first UE can quickly and accurately select or reselect one UE from the at least one candidate UE as a current relay UE of the first UE, to implement a relay UE selection or reselection process.

Figure 11:
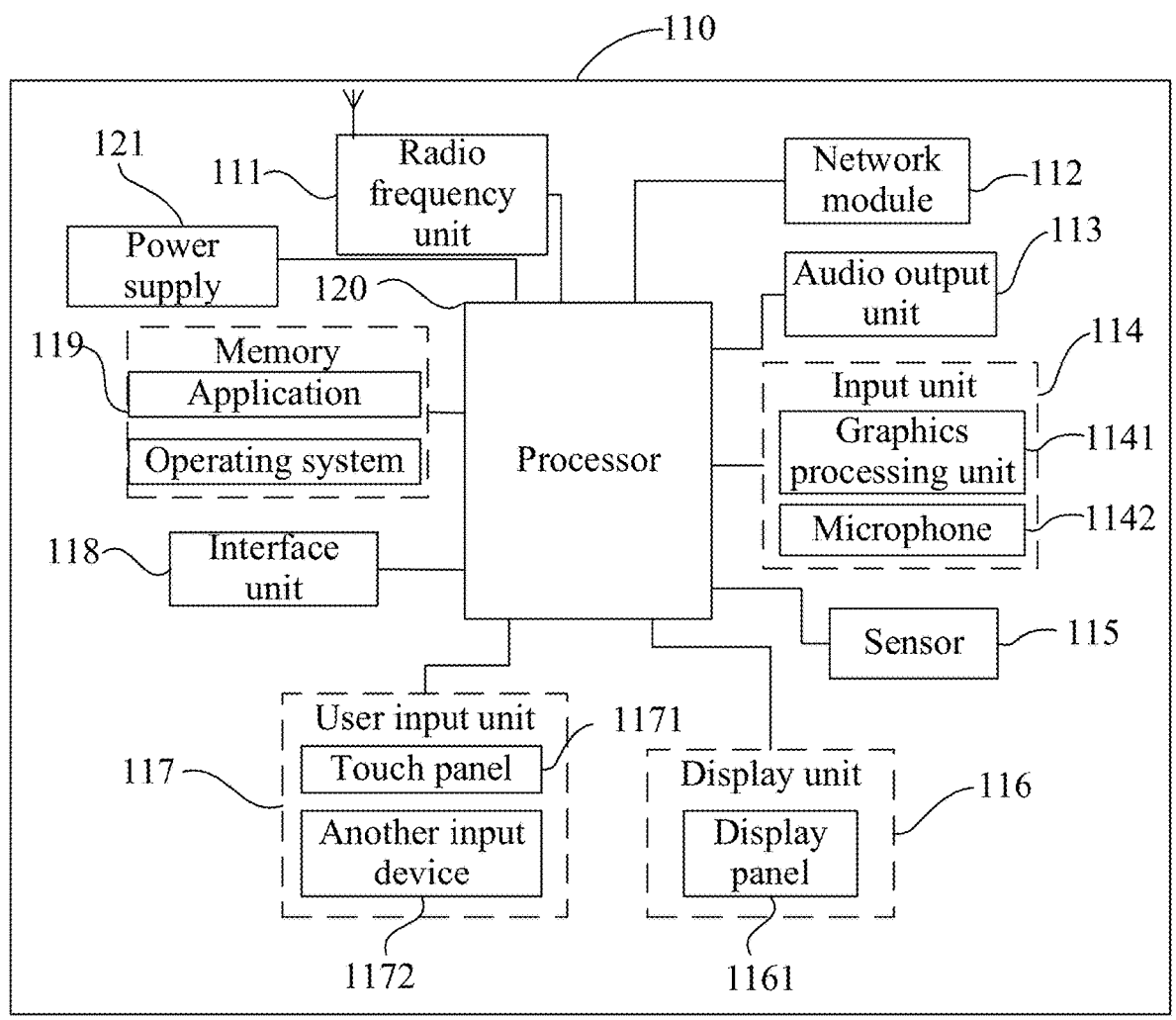
FIG. 11 is a schematic hardware diagram of a UE according to an embodiment of the present disclosure.

FIG. 11 is a schematic hardware diagram of a UE according to an embodiment of the present disclosure. As shown in FIG. 11, a UE 110 includes but is not limited to components such as a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that a person skilled in the art may understand that the structure of the UE shown in FIG. 11 does not constitute any limitation on the UE, and the UE may include more or fewer components than those shown in FIG. 11, or some components are combined, or a different component deployment is used. For example, in this embodiment of the present disclosure, the UE includes but is not limited to a mobile phone, a tablet computer, a notebook computer, a palmtop computer, an in-vehicle terminal, a wearable device, a pedometer, and the like.

The processor 120 is configured to obtain relay-related information corresponding to each candidate UE in at least one candidate UE; and perform relay UE selection or relay UE reselection according to the relay-related information corresponding to each candidate UE.

According to the UE provided in this embodiment of the present disclosure, the first UE can learn the relay-related information of each candidate UE or related information for restricting whether the first UE can select a candidate UE as a relay UE, so that the first UE can quickly and accurately select or reselect one UE from the at least one candidate UE as a current relay UE of the first UE, to implement a relay UE selection or reselection process.

It should be understood that, in this embodiment of the present disclosure, the radio frequency unit 111 may be configured to receive and send information or a signal in a call process. In some embodiments, after receiving downlink data from a base station, the radio frequency unit 111 sends the downlink data to the processor 120 for processing. In addition, the radio frequency unit 111 sends uplink data to the base station. Usually, the radio frequency unit 111 includes but is not limited to an antenna, at least one amplifier, a transceiver, a coupler, a low noise amplifier, a duplexer, and the like. In addition, the radio frequency unit 111 may communicate with a network and another device through a wireless communication system.

The UE provides wireless broadband Internet access for the user by using the network module 112, for example, helping the user to send and receive an e-mail, browse a web page, and access streaming media.

The audio output unit 113 may convert audio data received by the radio frequency unit 111 or the network module 112 or stored in the memory 119 into an audio signal and output the audio signal as a sound. In addition, the audio output unit 113 may further provide an audio output (for example, a call signal received voice, or a message received voice) related to a function implemented by the UE 110. The audio output unit 113 includes a speaker, a buzzer, a telephone receiver, and the like.

The input unit 114 is configured to receive an audio signal or a video signal. The input unit 114 may include a Graphics Processing Unit (GPU) 1141 and a microphone 1142, and the graphics processing unit 1141 processes image data of a still picture or video obtained by an image capture apparatus (such as a camera) in a video capture mode or an image capture mode. A processed image frame may be displayed on the display unit 116. The image frame processed by the graphics processing unit 1141 may be stored in the memory 119 (or another storage medium) or sent by using the radio frequency unit 111 or the network module 112. The microphone 1142 may receive a sound and can process such sound into audio data. Processed audio data may be converted, in a call mode, into a format that can be sent to a mobile communication base station by using the radio frequency unit 111 for output.

The UE 110 further includes at least one type of sensor 115, such as a light sensor, a motion sensor, and another sensor. In some embodiments, the light sensor may include an ambient light sensor and a proximity sensor. The ambient light sensor may adjust luminance of the display panel 1161 based on brightness of ambient light. The proximity sensor may turn off the display panel 1161 and/or backlight when the UE 110 moves to an ear. As a type of the motion sensor, an accelerometer sensor may detect an acceleration value in each direction (generally, three axes), and detect a value and a direction of gravity when the accelerometer sensor is static, and may be used for recognizing a posture of the UE (such as screen switching between landscape and portrait modes, a related game, or magnetometer posture calibration), a function related to vibration recognition (such as a pedometer or a knock), and the like. The sensor 115 may further include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information entered by a user or information provided for a user. The display unit 116 may include a display panel 1161. The display panel 1161 may be configured in a form of a Liquid Crystal Display (LCD), an Organic Light-Emitting Diode (OLED), or the like.

The user input unit 117 may be configured to receive input digit or character information, and generate a key signal input related to a user setting and function control of the UE. In some embodiments, the user input unit 117 includes a touch panel 1171 and another input device 1172. The touch panel 1171 is also referred to as a touchscreen, and may collect a touch operation performed by a user on or near the touch panel 1171 (such as an operation performed by a user on the touch panel 1171 or near the touch panel 1171 by using any proper object or accessory, such as a finger or a stylus). The touch panel 1171 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 120, and can receive and execute a command sent by the processor 120. In addition, the touch panel 1171 may be of a resistive type, a capacitive type, an infrared type, a surface acoustic wave type, or the like. The user input unit 117 may include another input device 1172 in addition to the touch panel 1171. In some embodiments, the another input device 1172 may include but is not limited to a physical keyboard, a functional button (such as a volume control button or a power on/off button), a trackball, a mouse, and a joystick. Details are not described herein.

Further, the touch panel 1171 may cover the display panel 1161. When detecting the touch operation on or near the touch panel 1171, the touch panel 1171 transmits the touch operation to the processor 120 to determine a type of a touch event, and then the processor 120 provides corresponding visual output on the display panel 1161 based on the type of the touch event. In FIG. 11, although the touch panel 1171 and the display panel 1161 are used as two independent parts to implement input and output functions of the UE, in some embodiments, the touch panel 1171 and the display panel 1161 may be integrated to implement the input and output functions of the UE. This is not specifically limited herein.

The interface unit 118 is an interface for connecting an external apparatus with the UE 110. For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 118 may be configured to receive input (for example, data information and power) from an external apparatus and transmit the received input to one or more elements in the UE 110 or may be configured to transmit data between the UE 110 and an external apparatus.

The memory 119 may be configured to store a software program and various data. The memory 119 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 119 may include a high-speed random access memory, and may further include a nonvolatile memory, for example, at least one magnetic disk storage device, a flash storage device, or another volatile solid-state storage device.

The processor 120 is a control center of the UE, and connects all parts of the entire UE by using various interfaces and lines. By running or executing a software program and/or a module stored in the memory 119 and invoking data stored in the memory 119, the processor 120 performs various functions and/or data processing of the UE, to perform overall monitoring on the UE. The processor 120 may include one or more processing units. For example, an application processor and a modem processor may be integrated into the processor 120. The application processor mainly processes an operating system, a user interface, an application, and the like. The modem processor mainly processes wireless communications. It can be understood that, alternatively, the modem processor may not be integrated into the processor 120.

The UE 110 may further include the power supply 121 (such as a battery) that supplies power to each component. For example, the power supply 121 may be logically connected to the processor 120 by using a power management system, so as to implement functions such as charging, discharging, and power consumption management by using the power management system.

In addition, the UE 110 includes some function modules not shown, and details are not described herein.

For example, an embodiment of the present disclosure further provides UE, including the processor 120 and the memory 119 shown in FIG. 11, and a computer program that is stored in the memory 119 and that can run on the processor 120. When the computer program is executed by the processor 120, the processes of the foregoing method embodiment are implemented and a same technical effect can be achieved. To avoid repetition, details are not described herein again.

An embodiment of the present disclosure further provides a computer-readable storage medium. The computer-readable storage medium stores a computer program, and when the computer program is executed by the processor 120 shown in FIG. 11, the processes of the foregoing method embodiment are implemented and a same technical effect can be achieved. To avoid repetition, details are not described herein again. The computer-readable storage medium includes a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal device (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A relay User Equipment (UE) determining method, performed by a first UE, wherein the method comprises:
  obtaining, from each candidate UE in at least one candidate UE, relay-related information corresponding to the respective candidate UE; and
  performing relay UE selection or relay UE reselection according to the relay-related information corresponding to the respective candidate UE, comprising:
    determining a candidate UE whose relay-related information meets a first preset condition in the at least one candidate UE as a target UE according to first target information of the candidate UE; and
    performing relay UE selection or relay UE reselection based on the target UE.

2. The method according to claim 1, wherein the relay-related information corresponding to the respective candidate UE comprises at least one of the following: first target information of the respective candidate UE, first configuration information, or second configuration information;
  the first target information of the respective candidate UE is information about the respective candidate UE;
  the first configuration information is used to indicate that the respective candidate UE is a UE or a UE type that provides a relay service; and
  the second configuration information is used to indicate a threshold for triggering relay UE selection or relay UE reselection.

3. The method according to claim 2, wherein the first target information of the respective candidate UE comprises at least one of the following: capability information, a first target identifier, a first relay identifier, first Radio Resource Control (RRC) state information, first resource allocation mode information, a first cell identifier, a first Radio access network Notification Area (RNA) identifier, a first Public Land Mobile Network (PLMN) identifier, first indication information, a first quantity, a second quantity, second indication information, or third indication information;
  the capability information is used to indicate whether the respective candidate UE is a relay UE, the first target identifier is used to indicate the respective candidate UE;
  the first relay identifier is an identifier of the respective candidate UE for relay pairing;
  the first RRC state information is used to indicate an RRC state of the respective candidate UE;
  the first resource allocation mode information is used to indicate a resource allocation mode of the respective candidate UE;
  the first cell identifier is used to indicate a cell in which the respective candidate UE is located;
  the first RNA identifier is used to indicate an RNA in which the respective candidate UE is located;
  the first PLMN identifier is used to indicate a PLMN in which the respective candidate UE is located;
  the first indication information is used to indicate a base station connection architecture corresponding to the respective candidate UE;
  the first quantity is a current quantity of UEs for which the respective candidate UE is a relay UE;
  the second quantity is a total quantity of UEs for which the respective candidate UE is a relay UE;
  the second indication information is used to indicate whether a PC5-RRC connection exists between the respective candidate UE and the first UE; and
  the third indication information is used to indicate whether a PC5-S connection exists between the respective candidate UE and the first UE.

4. The method according to claim 3, wherein that the PC5-RRC connection exists between the respective candidate UE and the first UE comprises at least one of the following: the first UE comprises context information of the respective candidate UE, the first UE receives a PC5-RRC reconfiguration message of the respective candidate UE, the first UE sends a PC5-RRC reconfiguration complete message to the respective candidate UE, an established Data Resource Bearer (DRB) exists between the first UE and the respective candidate UE, or an established Signaling Resource Bearer (SRB) exists between the first UE and the respective candidate UE.

5. The method according to claim 3, wherein that the PC5-S connection exists between the respective candidate UE and the first UE comprises at least one of the following: the first UE comprises a link identifier of a unicast connection to the respective candidate UE, the first UE comprises a target node identifier of the unicast connection to the respective candidate UE, or the first UE comprises a source node identifier of the unicast connection to the respective candidate UE.

6. The method according to claim 1, wherein the first preset condition comprises at least one of the following: a candidate UE is a relay UE, a first target identifier of a candidate UE is within a first preset range, a first relay identifier of a candidate UE is within a second preset range or is the same as a relay identifier of the first UE, an RRC state of a candidate UE is a preset state, a resource allocation mode of a candidate UE is a preset mode, a first cell identifier of a candidate UE is within a third preset range or is the same as a cell identifier of the first UE, a first RNA identifier of a candidate UE is within a fourth preset range or is the same as an RNA identifier of the first UE, a first PLMN identifier of a candidate UE is a preset PLMN identifier or is the same as a PLMN identifier of the first UE, a base station connection architecture of a candidate UE is a preset connection architecture or is the same as a base station connection architecture of the first UE, a first quantity of candidate UEs is less than a first preset threshold, a second quantity of candidate UEs is less than a second preset threshold, a PC5-RRC connection exists between a candidate UE and the first UE, or a PC5-S connection exists between a candidate UE and the first UE.

7. The method according to claim 2, wherein the first configuration information comprises at least one of the following: a first identifier range, a relay identifier range, second Radio Resource Control (RRC) state information, second resource allocation mode information, a cell identifier range, a Radio access network Notification Area (RNA) identifier range, a Public Land Mobile Network (PLMN) identifier range, or a target Quality of Service (QoS)-related information;
the first identifier range is used to indicate at least one second UE, and the respective candidate UE is a relay UE of the at least one second UE;
the relay identifier range comprises an identifier of at least one third UE for relay pairing, and the respective candidate UE is a relay UE of the at least one third UE;
the second RRC state information is used to indicate a target RRC state, and the respective candidate UE is a relay UE of UE whose RRC state is the target RRC state;
the second resource allocation mode information is used to indicate a target resource allocation mode, and the respective candidate UE is a relay UE of UE whose resource allocation mode is the target resource allocation mode;
the cell identifier range is used to indicate at least one cell, and the respective candidate UE is a relay UE of UE that is currently in any cell in the at least one cell;
the RNA identifier range is used to indicate at least one RNA, and the respective candidate UE is a relay UE of UE that is currently in any RNA in the at least one RNA;
the PLMN identifier range is used to indicate at least one PLMN, and the respective candidate UE is a relay UE of UE that is currently in any PLMN in the at least one PLMN; and
the target QoS-related information is used to indicate a target QoS condition, and the respective candidate UE is a relay UE of UE whose QoS-related information meets the target QoS condition.

8. The method according to claim 7, wherein the QoS-related information comprises at least one of the following: a Prose Quality of service Indication (PQI), a PC5 Packet Flow Identifier (PFI), a QoS parameter, a PC5 flow bit rate, or a QoS range; and
the PC5 flow bit rate comprises at least one of the following: a Guaranteed Flow Bit Rate (GFBR) or a Maximum Flow Bit Rate (MFBR).

9. The method according to claim 7, wherein the performing relay UE selection or relay UE reselection according to the relay-related information corresponding to the respective candidate UE comprises:
determining a UE corresponding to a second preset condition in the at least one candidate UE as the target UE, according to first configuration information corresponding to the respective candidate UE when the first UE meets the second preset condition; and
performing relay UE selection or relay UE reselection based on the target UE;
wherein the second preset condition comprises at least one of the following: a second target identifier of the first UE is within the first identifier range, a relay identifier of the first UE is within the relay identifier range, an RRC state of the first UE is the target RRC state, a resource allocation mode of the first UE is the target resource allocation mode, a second cell identifier of the first UE is within the cell identifier range, a second RNA identifier of the first UE is within the RNA identifier range, a second PLMN identifier of the first UE is within the PLMN identifier range, or QoS-related information of the first UE meets the target QoS condition;
the second target identifier is used to indicate the first UE;
the second cell identifier is used to indicate a cell in which the first UE is located;
the second RNA identifier is used to indicate an RNA in which the first UE is located; and
the second PLMN identifier is used to indicate a PLMN in which the first UE is located.

10. The method according to claim 2, wherein the second configuration information comprises at least one of the following: a Channel Busy Ratio (CBR) threshold, a first reference signal measurement threshold of a Uu interface, or a second reference signal measurement threshold of a PC5 interface.

11. The method according to claim 10, wherein the performing relay UE selection or relay UE reselection according to the relay-related information corresponding to the respective candidate UE comprises:
performing relay UE selection or relay UE reselection according to the relay-related information corresponding to the respective candidate UE when relay UE selection or relay UE reselection is triggered.

12. The method according to claim 11, wherein before the performing relay UE selection or relay UE reselection according to the relay-related information corresponding to the respective candidate UE when relay UE selection or relay UE reselection is triggered, the method further comprises:
triggering relay UE selection when second target information meets a third preset condition, wherein the second target information comprises at least one of the following: a first measurement report of a fourth UE, a first measurement result of the first UE, or a first CBR of the first UE;
wherein the first measurement report is obtained after the fourth UE performs measurement based on measurement configuration information sent by the first UE;
the first measurement result is obtained after the first UE measures a reference signal of a Uu interface of the first UE;
the fourth UE is a UE in the at least one candidate UE; and
wherein the third preset condition comprises at least one of the following: the first measurement report is reported based on a first preset event, a measurement value in the first measurement report is greater than or equal to the second reference signal measurement threshold, the first measurement result is less than or equal to the first reference signal measurement threshold, or the first CBR is less than or equal to the CBR threshold.

13. The method according to claim 11, wherein before the performing relay UE selection or relay UE reselection according to the relay-related information corresponding to the respective candidate UE when relay UE selection or relay UE reselection is triggered, the method further comprises:

triggering relay UE reselection when third target information meets a fourth preset condition, wherein the third target information comprises at least one of the following: a second measurement report of a fifth UE, a first measurement result of the first UE, or a first CBR of the first UE;

wherein the second measurement report is obtained after the fifth UE performs measurement based on measurement configuration information sent by the first UE;

the first measurement result is obtained after the first UE measures a reference signal of a Uu interface of the first UE; and the fifth UE is a current relay UE of the first UE; and wherein the fourth preset condition comprises at least one of the following: the second measurement report is reported based on a second preset event, a measurement value in the second measurement report is less than or equal to the second reference signal measurement threshold, the first measurement result is less than or equal to the first reference signal measurement threshold, or the first CBR is greater than or equal to the CBR threshold.

14. The method according to claim 11, wherein before the performing relay UE selection or relay UE reselection according to the relay-related information corresponding to the respective candidate UE when relay UE selection or relay UE reselection is triggered, the method further comprises:

receiving fourth indication information sent by a sixth UE, wherein the fourth indication information is used to trigger the first UE to perform relay UE reselection, the sixth UE is a current relay UE of the first UE, and the fourth indication information is sent by the sixth UE when fourth target information meets a fifth preset condition;

the fourth target information comprises at least one of the following: a third measurement report of the first UE, a second measurement result of the sixth UE, or a second CBR of the sixth UE;

the third measurement report is obtained after the first UE performs measurement based on measurement configuration information sent by the sixth UE;

the second measurement result is obtained after the sixth UE measures a reference signal of a Uu interface of the sixth UE; and wherein the fifth preset condition comprises at least one of the following: the third measurement report is reported based on a third preset event, a measurement value in the third measurement report is less than or equal to the second reference signal measurement threshold, the second measurement result is greater than or equal to the first reference signal measurement threshold, or the second CBR is greater than or equal to the CBR threshold.

15. The method according to claim 12, wherein the measurement configuration information comprises at least one of the following: a measurement object, a measurement reporting configuration, a measurement identifier, a measurement quantity configuration, or a measurement gap; and wherein the measurement reporting configuration is used to configure periodic measurement or event-based measurement.

16. The method according to claim 1, wherein obtaining, from each candidate UE in the at least one candidate UE, relay-related information corresponding to the respective candidate UE comprises:

receiving, for the respective candidate UE, a sidelink Radio Resource Control (RRC) message sent by the respective candidate UE, wherein the sidelink RRC message comprises relay-related information corresponding to the respective candidate UE;

wherein the sidelink RRC message comprises at least one of the following: a UE capability message or a sidelink RRC reconfiguration message.

17. The method according to claim 1, wherein for each candidate UE, the relay-related information corresponding to the respective candidate UE is obtained in any one of the following manners: being obtained from a broadcast message or a sidelink RRC message sent by the respective candidate UE, being configured by a network device, being preconfigured by the network device, being preconfigured at delivery, or being specified by a protocol.

18. A User Equipment (UE), comprising:
a memory storing computer-readable instructions; and
a processor coupled to the memory and configured to execute the computer-readable instructions, wherein the computer-readable instructions, when executed by the processor, cause the processor to perform operations comprising:

obtaining, from each candidate UE in at least one candidate UE, relay-related information corresponding to the respective candidate UE; and performing relay UE selection or relay UE reselection according to the relay-related information corresponding to the respective candidate UE, comprising;

determining a candidate UE whose relay-related information meets a first preset condition in the at least one candidate UE as a target UE according to first target information of the candidate UE; and performing relay UE selection or relay UE reselection based on the target UE.

19. A non-transitory computer-readable medium storing instructions that, when executed by a processor, cause the processor to perform operations comprising:

obtaining, from each candidate user equipment (UE) in at least one candidate UE, relay-related information corresponding to the respective candidate UE; and performing relay UE selection or relay UE reselection according to the relay-related information corresponding to the respective candidate UE, comprising:

determining a candidate UE whose relay-related information meets a first preset condition in the at least one candidate UE as a target UE according to first target information of the candidate UE; and performing relay UE selection or relay UE reselection based on the target UE.

* * * * *